United States Patent Office 3,308,023
Patented Mar. 7, 1967

3,308,023
THERAPEUTIC COMPOSITIONS CONTAINING 6-[D - 2 - (D - 2 - AMINO - 2 - PHENYLACETAMIDO)-2-PHENYLACETAMIDO]PENICILLANIC ACID
Peter B. Russell, Villanova, Pa., assignor to American Home Products Corporation, New York, N.Y., a corporation of Delaware
No Drawing. Filed Aug. 20, 1964, Ser. No. 391,833
8 Claims. (Cl. 167—65)

The present invention relates generally to the inhibition and alleviation of gastrointestinal infections by microbial pathogens. More particularly, the invention concerns the use, by the oral route, of a new therapeutic composition having desirable antimicrobial activity against gastrointestinal maladies caused by the growth of gram negative or gram positive microorganisms.

It is a prime object of my invention to utilize, in a novel way, a unique antibiotic composition comprising the newly discovered synthetic derivative of 6-aminopenicillanic acid, 6-[D-2-(D-2-amino-phenylacetamido)-2-phenylacetamido] penicillanic acid, which may be designated by the structure:

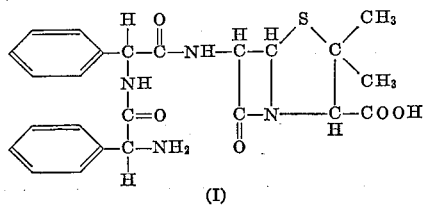
(I)

and which has shown the unexpected property of retention in the walls of the gastrointestinal tract of mammals, whereby the antimicrobial activity of said derivative at said site persists. This property renders it quite useful in treatment of certain gastrointestinal disorders when it is employed alone. A combination of compound (1) above with another antibiotic material having systemic antimicrobial activity, as referred to hereinafter, has been found to be more effective in treating diseases having both enteric and systemic involvement, such as typhoid. Moreover, 40 to 98% of other various antidiarrheal agents such as kaolin, pectin, activated charcoal, or other substances used singly or in combination to decrease intestinal motility or absorb enterotoxins in enteric conditions in mammals including humans, may be added thereto.

In said combinative aspect of my invention, the compound of structure (I) above may be admixed in equal amount with the systematically active synthetic penicillin, 6-(D-2-phenylacetamido) penicillanic acid (ampicillin), (disclosed in U.S.P. 2,985,648) for the treatment of typhoid, wherein the entire system as well as the intestinal tract of the animal is involved, and as a result reduce infection in both the gastrointestinal and circulatory systems simultaneously.

By way of illustration of the comparative unique quality of my invention, one may consider the recent advances in the field of synthetic penicillins as exemplified by those synthetic penicillins of the general structure:

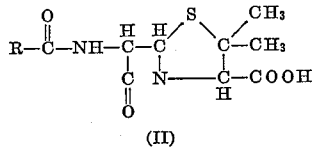
(II)

wherein R represents a substituent selected from saturated or unsaturated alkyl groups, aryl groups, aralkyl groups as well as other heterocyclic, or alicyclic analogs thereof.

In those compounds where R represents a select functional group such as (1) and (2) below:

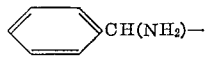   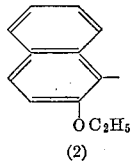

(1)                    (2)

which compounds represent the recently commercially proven synthetic pencillins, ampicillin (referred to hereinbefore) and nafcillin, respectively; it is to be noted comparatively, that these materials, while quite active systemically, suffer from a lack of potency in gastrointestinal sterilization, due to their rapid rate of absorption through the tissues of the gastrointestinal wall into the vascular system, when administered orally. Hence, it is quite unexpected in and of itself that the derivative 6-[D-2-(D-2-amino - phenylacetamido) - 2 - phenylacetamido] penicillanic acid (I) where R in (II) above represents the functional group (3) below:

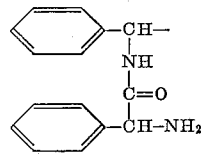

(3)

would evince such a contrary property. This initial finding permitted the further discovery that the compound (I) could be combined in varying proportions with ampicillin to achieve a treatment of those microbial infections in both humans and livestock, which are characterized as having a focal point in the gastrointestinal tract, but nonetheless are spread throughout the entire organism via the vascular system.

The present invention, therefore, in another aspect, covers the use of the specific penicillin 6-[D-2-(D-2-amino-2-phenylacetamido)-2-phenylacetamido] penicillanic acid in conjunction with an antidiarrheal agent and/or with ampicillin, to treat infections primarily involving the gastrointestinal tract.

The instant novel penicillin component remains in the gut for a 48 to 72 hour period and since it is not readily destroyed in the intestine, it remains there for several days to exert a therapeutic effect. Therefore, this type of penicillin is of beneficial use in the treatment of typhoid, for which, illustratively, in admixture with an equal amount of the known commercial antibiotic, ampicillin; it can be administered orally to humans in doses ranging from 120–300 mg./kilo to exert an antimicrobial effect.

When considered for use in veterinary medicine the medication can be given orally by adding to grain or drinking water over a period of 3–7 days in an admixture of about 50 grams of antibiotic per ton of grain, either by itself or combined with ampicillin.

Underlying both of the above uses of the gastrointestinal tract antimicrobial agent, compound (I), is the unique capacity of this compound to resist absorption and be retained in the wall of the intestine, so as to avoid excretion with the fecal matter of the animal. The following evaluation in Table I of the rate of fecal elimination of ampicillin, nafcillin, and 6-[D-2-(D-2-amino-phenylacetamido)-2-phenylacetamido] penicillanic acid from the rat will serve as illustration of said capacity.

TABLE I

[Fecal elimination of penicillins following single oral administration: Dosage, 50 mg./kg.; No. animals, 4 per time interval]

| Penicillin | Concentration, µg./g. | | |
|---|---|---|---|
| | 0 hr. | 24 hr. | 48 hr. |
| Ampicillin | 0 | 80.2 | 2.1 |
| Nafcillin | 0 | 100.2 | 4.0 |
| Compound (I) | 0 | 378.3 | 24.4 |
| Control | 0 | 0 | 0 |

From the above test data, it can be noted that while ampicillin had dropped to 4.0 µg./g. in the feces after 48 hours in the intestine and nafcillin had dropped to 2.1 µg./g., compound (I) was still showing up in the feces at a level 6 to 12 times greater than the first two penicillins, indicating that a considerable amount of said compound (I) had remained in the intestinal tract available for antimicrobial activity.

The discovery of the novel antimicrobial activity of compound (I) provides novel means for the treatment of infections of the gut at present solely limited to other non-penicillin type antibiotics. In contrast to prior art antibiotics of the mycin type, such as, streptomycin, terramycin, aureomycin, or chloromycetin, the present antibiotic composition is substantially free of side effects, yet exhibits a broad spectrum of antimicrobial activities against both gram positive and gram negative microbes when compared with the potassium salt of benzyl penicillin (K pen G) as shown in the following Table II.

TABLE II

[D-2-(D-2-amino-2-phenylacetamido)-2-phenylacetamido]
[Range tested: .0038-250 µg./ml.]

| Test Organism | Minimal Inhibitory Concentration, µg./ml. | | |
|---|---|---|---|
| | Strain | Compound (I) [1] | K pen G [2] |
| Staphylococcus aureus | 209P | .488 | .031 |
| | 53–180 | 100 | 250 |
| | CHP | 15.6 | 31.3 |
| | T40 | 3.90 | 3.90 |
| | T26 | 1.95 | 1.95 |
| | T4 | 3.90 | 1.95 |
| | 5034 | 3.90 | 15.6 |
| | 5401 | 3.90 | 3.90 |
| | 5811 | 7.81 | 62.5 |
| | 6055 | 3.90 | 3.90 |
| Streptococcus faecalis | 6057 | 1.95 | .976 |
| Streptococcus bovis | 9809 | .488 | .122 |
| Streptococcus pyogenes | 10384 | .122 | .0152 |
| Diplococcus pneumoniae | Type 1-37 | .244 | .122 |
| Escherichia coli | 6880 | 15.6 | 31.3 |
| Escherichia coli | 11370 | 7.81 | 15.6 |
| Proteus vulgaris | 6896 | 62.5 | 62.5 |
| Klebsiella pneumoniae | 10031 | 15.6 | 62.5 |
| Salmonella paratyphi | 11737 | 15.6 | 15.6 |

[1] [D-2-(D-2-amino-2-phenylacetamido)-2-phenylacetamido] penicillanic acid.
[2] The potassium salt of benzyl penicillin.

The various aspects of my invention will be further illustrated by the following examples of preparation and uses of various compositions within the scope of my inventive concept.

EXAMPLE 1

6-[D-2-(D-2-amino-2-phenylacetamido)-2-phenylacetamido] penicillanic acid

Mix 420 mg. (1.2 millimoles) of 6-(D-2-amino-2-phenylacetamido)-penicillanic acid with 121 mg. (1.2 millimoles) of D-phenylglycine in 30 ml. of ice cold water. Stir at 1–2° for 60 minutes, keeping the pH at 6.0 by the addition of 1 N NaOH. Filter, and freeze-dry the filtrate.

The product obtained, as shown in Table 2 above, is active against *Staph. aureous* and *E. coli*.

EXAMPLE 2

Oral suspension

A suspension for oral use of the antibiotic compound of Example 1 was made up so that each 100 cc. contained:

Ingredient:
  6 - [D - 2-(D-2-amino-2-phenylacetamido)-2-phenylacetamido] penicillanic acid (micropulverized) _____ gms __ 1.1176
  Kaolin _____ gms __ 10.00
  Alumina gel (2.45% $Al_2O_3$) _____ mls __ 36.00
  Pectin N.F. _____ gms __ 0.90
  Phosphate buffer (pH 6.0–6.5) _____ gm __ 1.00
  Preservatives, Flavors.
  Water, q.s. to 100 cc.

When placed in a gelatin containing 1.00 cc. each of the above formula, the composition may be administered to mammals, including humans, to arrest and alleviate growth of various microbial pathogens in the alimentary canal, especially *Staph. aureus* and *E. coli*.

EXAMPLE 3

Oral suspension

A stable suspension of the following formula was made up and administered orally to treat clinical cases of calf scours. The formulation was such that 500 cc. contained:

| Ingredient: | Amount (grams) |
|---|---|
| 6 - [D - 2 - (D-2-amino-2-phenylacetamido)-2-phenylacetamido] penicillanic acid | 2.4 |
| Kaolin | 76.8 |
| Pectin | 4.8 |
| Pharmasorb | 32.0 |
| Methylparaben, 0.05% | |
| Butylparaben, 0.04% | |
| Propylparaben, 0.01% | |
| Water, qs. to 500 cc. | |

For therapeutic purposes 29.6 cc. of the above suspension will supply 150 mg. of the penicillanic acid derivative. The above formula was administered to calves showing a non-specific enteritis condition. A dosage of 2 ounces orally, twice a day for 2 days resulted in good clinical response.

EXAMPLE 4

A stable suspension having the following formula was made up as a therapeutic composition for treating calves scours:

| Ingredient: | Amount (grams) |
|---|---|
| 6-[D-2-(D-2-amino-phenylacetamido)-2-phenylacetamido]penicillanic acid | 2.4 |
| Commercial ampicillin | 2.4 |
| Kaolin | 76.8 |
| Pectin | 4.8 |
| Pharmasorb | 32.0 |
| Preservative: | |
|   0.05% methylparaben | |
|   0.04% butylparaben | |
|   0.01% propylparaben | |
| Water, qs. to 500 cc. | |

For therapeutic purposes, 29.6 cc. of the above stable suspension provides 150 mg. of ampicillin and 150 mg. of 6 - [D-2-(D-2-amino-phenylacetamido)-2-phenylacetamido]penicillanic acid.

EXAMPLES 5 TO 7

The following Examples 5 to 7 tabulated in Table 3 and below will illustrate further the scope of my invention with respect to the use, in various forms of 6-[D-2-(D-2- amino - phenylacetamido)-2-phenylacetamido]penicillanic acid:

TABLE 3

| Ex. | Usage | Animals Affected | Causative Agents | Route and Duration of Treatment | Dosage |
|---|---|---|---|---|---|
| 5 | Treatment of infectious scours or dysentery of adult or fattening animals. | All livestock, chickens, dogs and cats. | Salmonella spp., *E. coli*, Aerobacter, Shigella, Corynebacterium, Vibrio, Pseudomonas, Proteus and other infective microorganisms. | Medication is given orally by adding to grain, adding to concentrate, or to drinking water. Usual treatment 3-7 days. | 5-25 mg./lb. or 50-500 gm./ton of concentrate |
| 6 | Treatment of infectious scours or dysentery in young animals. | ___do___ | ___do___ | Medication is given as above or administered in tablet or suspension. Usual treatment 3-7 days. | 5-25 mg./lb. or 50-500 gm./ton of feed. |
| 7 | To control non-clinical enteric conditions. | All livestock and chickens. | ___do___ | Medication is given in grain concentrate or drinking water. Continuous administration through feeding period. | 10-50 gm./ton of feed. |

In regard to the carriers which may be used in formulating therapeutic compositions based on 6-[D-2-(D-2-amino-phenylacetamido)-2-phenylacetamido]penicillanic acid it will be apparent that various well known liquid carriers as water, isotonic saline. mineral, or vegetable oil, may be used. Likewise, various other solid excipients, binders, extenders and carriers, in addition to those referred to in the examples may be employed such as, carboxymethylcellulose, various starches, sugars, such as, dextrose, sorbital, and the like, may be added where powders are to be employed as means of administration. However administered, whether in suspension, powder, tablet, capsule or bolus form, the dosage of the novel penicillanic acid derivative will vary with the severity of the ailment and the size of the mammal being treated, as will be known to those skilled in the art.

In connection with the use of a suitable preservative, any one which is pharmaceutically acceptable may be employed, in addition to those enumerated in the several embodiments. Such well known preservatives as butylated hydroxyanisole or butylated hydroxytoluene may be employed, for example.

I claim:

1. A composition for the oral treatment of gastrointestinal infections which comprises a pharmaceutically effective dose of a derivative of 6-amino-penicillanic acid having the structure:

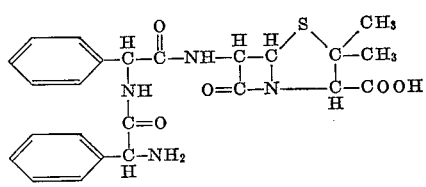

and a pharmaceutically effective amount of ampicillin.

2. A composition according to that of claim 1 which includes a major amount of an active antidiarrheal agent.

3. A composition for the oral treatment of gastrointestinal infections which comprises a pharmaceutically effective dose of a derivative of 6-aminopenicillanic acid having the structure:

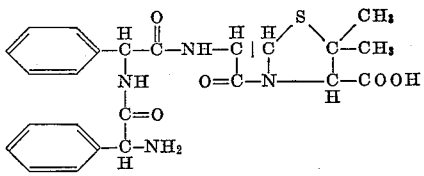

and a major amount of an active antidiarrheal agent.

4. A composition according to claim 3 wherein the antidiarrheal agent is kaolin.

5. A composition for the treatment of gastrointestinal infections which comprises in each 500 ml. the following ingredients:

| Ingredient: | Amount (grams) |
|---|---|
| 6-[D-2-(D-2-amino-2-phenylacetamido)-2-phenylacetamido]penicillanic acid | 2.4 |
| Kaolin | 76.8 |
| Pectin | 4.8 |
| Pharmasorb (attapulgite clay) | 32.0 |

6. A method for the alleviation of gastrointestinal infections in mammals which comprises administering orally to the mammal a pharmaceutically effective dose of the compound 6 - [D - 2-(D-2-amino-2-phenylacetamido)-2-phenylacetamido]penicillanic acid in a pharmaceutically acceptable carrier.

7. A composition comprising:

| Ingredient: | Amount (grams) |
|---|---|
| 6-[D-2-(D-2-amino-2-phenylacetamido)-2-phenylacetamido]penicillanic acid | 2.4 |
| Ampicillin | 2.4 |
| Kaolin | 76.8 |
| Pectin | 4.8 |
| Pharmasorb (attapulgite clay) | 32.0 |

8. A method for the alleviation of gastrointestinal infections in mammals which comprises administering orally to the mammal a pharmaceutically effective dose of the composition of claim 2.

No references cited.

SAM ROSEN, *Primary Examiner.*

JEROME D. GOLDBERG, *Assistant Examiner.*